(12) United States Patent
Hsu et al.

(10) Patent No.: US 9,781,652 B2
(45) Date of Patent: Oct. 3, 2017

(54) METHOD AND APPARATUS OF LWA PDU ROUTING

(71) Applicant: MEDIATEK INC., Hsinchu (TW)

(72) Inventors: Chia-Chun Hsu, New Taipei (TW); Pavan Santhana Krishna Nuggehalli, Mountain View, CA (US); Chie-Ming Chou, Taichung (TW)

(73) Assignee: MEDIATEK INC., HsinChu (TW)

( * ) Notice: Subject to any disclaimer, the term of this patent is extended or adjusted under 35 U.S.C. 154(b) by 58 days.

(21) Appl. No.: 15/015,396

(22) Filed: Feb. 4, 2016

(65) Prior Publication Data
US 2016/0234752 A1 Aug. 11, 2016

Related U.S. Application Data

(60) Provisional application No. 62/112,196, filed on Feb. 5, 2015.

(51) Int. Cl.
*H04W 4/00* (2009.01)
*H04W 40/02* (2009.01)
(Continued)

(52) U.S. Cl.
CPC ......... *H04W 40/02* (2013.01); *H04L 12/4641* (2013.01); *H04L 45/66* (2013.01);
(Continued)

(58) Field of Classification Search
CPC .......... H04L 2012/5608; H04W 84/12; H04W 88/08; H04W 80/04; H04W 8/26; H04W 88/06
(Continued)

(56) References Cited

U.S. PATENT DOCUMENTS 8,891,420 B2 * 11/2014 Chen ................ H04L 69/18
370/310
9,258,755 B1 * 2/2016 Ramamurthy ........ H04W 36/14
(Continued)

FOREIGN PATENT DOCUMENTS

WO WO2013143051 A1 10/2013

OTHER PUBLICATIONS

International Search Report and Written Opinion of International Search Authority for PCT/CN2016/073581 dated May 13, 2016 (11 pages).

*Primary Examiner* — Brenda H Pham
(74) *Attorney, Agent, or Firm* — Imperium Patent Works; Helen Mao

(57) ABSTRACT

Apparatus and methods are provided for LWA PDU routing. In one novel aspect, LTE PDU packets are routed through a WLAN AP to a UE by encapsulation of the data packets. An adaption layer encapsulate the whole packet as an Ethernet frame by appending the Ethernet MAC header to the payload. In other embodiments, the adaption layer encapsulates LTE PDU as GRE packet, configures VLAN for WLAN AP. In another novel aspect, the LTE PDU is identified by at least one of methods comprising the EtherType value, the source address, the GRE header, and the GTP header. In another embodiment, the default path is always used for LWA routing. In yet another novel aspect, the LTE PDU is forwarded by the MAC address, by the GRE tunnel configuration, or by the GTP tunnel configuration.

20 Claims, 9 Drawing Sheets

(51) Int. Cl.
*H04L 12/46* (2006.01)
*H04L 12/741* (2013.01)
*H04L 12/721* (2013.01)
*H04W 76/02* (2009.01)

(52) U.S. Cl.
CPC ........... *H04L 45/74* (2013.01); *H04W 76/026* (2013.01); *H04W 76/022* (2013.01)

(58) Field of Classification Search
USPC ...................... 370/310.2, 328, 331, 349, 338
See application file for complete search history.

(56) References Cited

U.S. PATENT DOCUMENTS

| | | | |
|---|---|---|---|
| 9,265,055 B2* | 2/2016 | Okuda | H04W 72/085 |
| 2008/0089272 A1 | 4/2008 | Ahokangas | 370/328 |
| 2013/0343288 A1 | 12/2013 | Ratasuk et al. | 370/329 |
| 2016/0174107 A1* | 6/2016 | Kanugovi | H04L 12/28 |
| | | | 370/236 |

* cited by examiner

METHOD AND APPARATUS OF LWA PDU ROUTING

CROSS REFERENCE TO RELATED APPLICATIONS

This application claims priority under 35 U.S.C. §119 from U.S. Provisional Application No. 62/112,196 entitled "METHOD AND APPARATUS OF LWA PDU ROUTING" filed on Feb. 5, 2015, the subject matter of which is incorporated herein by reference.

TECHNICAL FIELD

The disclosed embodiments relate generally to wireless communication, and, more particularly, to LTE-WLAN aggregation (LWA) PDU routing.

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Internetworking between the LTE network and the unlicensed spectrum WLAN provides additional bandwidth to the operators. The LTE-WLAN aggregation (LWA) provides data aggregation at the radio access network where an eNB schedules packets to be served on LTE and WiFi radio link. The advantage of this solution is that it can provide better control and utilization of resources on both links. This can increase the aggregate throughput for all users and improve the total system capacity by better managing the radio resources among users. However, issues remain as to how to implement efficiently the LWA. The first issue is how to handle the U-plane (LTE packet data unit (PDU)) bearer splitting for the LWA. The second issue is how to identify the LTE PDU by the WLAN AP modem or WLAN WiFi modem and how to make correct operations.

Improvements and enhancements are required for LWA PDU routing.

SUMMARY

Apparatus and methods are provided for LWA PDU routing. In one novel aspect, LTE PDU packets are routed through a WLAN AP to a UE by encapsulation of the data packets. In one embodiment, an adaption layer associated with the PDCP layer treats the LTE PDU as a payload and appends the Ethernet MAC header to encapsulate the whole packet as an Ethernet frame. In another embodiment, the adaption layer encapsulates the first RAN PDU as GRE packet. In yet another embodiment, the adaption layer uses a VLAN configures for LWA purposes.

In another novel aspect, solutions for the LTE PDU identification are provided for LWA. In one embodiment, the EtherType value is used as the identification. In other embodiments, the source address, the GRE header, and the GTP header can be used as the identification. In yet another embodiment, the default path is always used for LWA routing.

In yet another novel aspect, solutions for the LTE PDU forwarding is provided for the LWA. In one embodiment, the MAC address is appended for the encapsulation. In another embodiment, the GRE tunnel configuration is followed. In yet another embodiment, the GTP tunnel configuration is followed.

In one novel aspect, LWA applies to data aggregation between different radio access technologies (RAT). The UE can aggregation data traffic from multiple radio access links using different radio access network (RAN). In this specification, the LTE technology is used throughout as an exemplary first RAN. Similarly, the WLAN technology is used as an exemplary second RAN. It is understood by one of ordinary skills in the art that other RAN can be used in place of the LTE as the first RAN and WLAN as the second RAN.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

LWA is a tight integration at radio level, which allows for real-time channel and load aware radio resource management across WLAN and LTE to provide significant capacity and QoE improvements. When enabling LWA, S1-U is terminated at eNB whereby all IP packets are routing to eNB and perform PDCP aspects (i.e., ROHC, ciphering) as an LTE PDU. Afterwards, eNB can schedule whether LWA-LTE link or LWA-Wi-Fi link the LTE PDU shall go. In this invention, we disclose how a LTE PDU being routing over eNB-AP and AP-Wi-Fi modem. To this end, adaption layer with (de-) encapsulation mechanism located at eNB and Wi-Fi modem is introduced to provide such innovation without changing WLAN AP behavior significantly. LWA borrows the concept of existing dual connectivity to let WLAN network being transport to CN for reducing CN load and support "Packet level" offload. It is understood by one of ordinary skills in the art that the principle of the methods may apply other data aggregation scenarios. Though LTE and WLAN are being used in the description, the disclosed method applies to other RAN as well.

Figure 1:
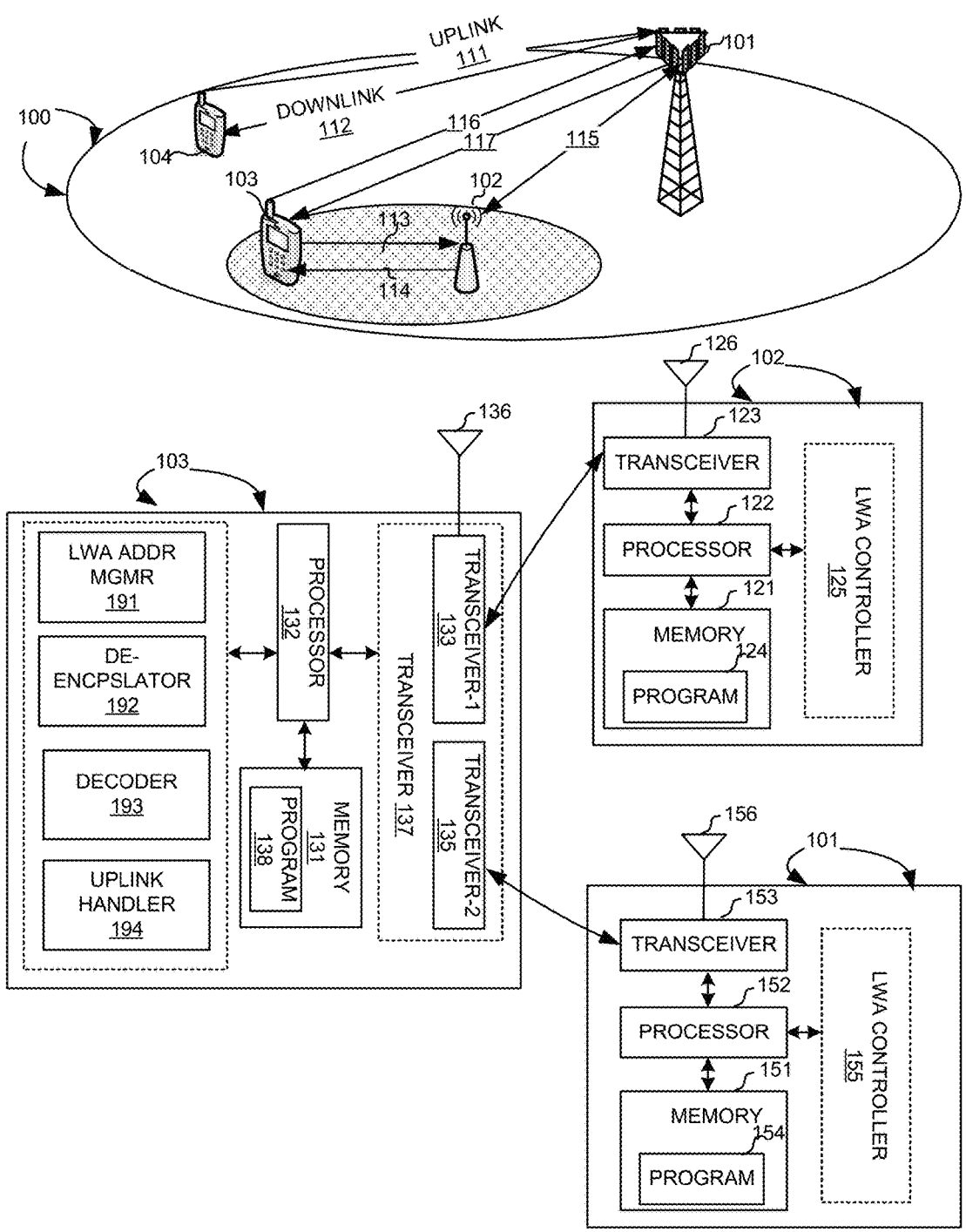
FIG. 1 illustrates a system diagram of a wireless network with LWA in accordance with embodiments of the current invention.

FIG. 1 illustrates a system diagram of a wireless network 100 with the LWA in accordance with embodiments of the current invention. Wireless communication system 100 includes one or more fixed base infrastructure units, such as base stations 101 and 102, forming a network distributed over a geographical region. The base unit may also be referred to as an access point, an access terminal, a base station, a Node-B, an eNode-B, or by other terminology used in the art. The one or more base stations 101 and 102 serve a number of mobile stations 103 and 104 within a serving area, for example, a cell, or within a cell sector. Base stations 101 and 102 can support different RATS. In a particular example, base station 101 is a LTE eNB and 102 is a WLAN access point (AP). The two base stations simultaneously serve the mobile station 103 within their common coverage.

eNB 101 and WLAN AP 102 transmit downlink communication signals 112, 114 and 117 to mobile stations in the time and/or frequency domain. Mobile station 103 and 104 communicate with one or more eNB 101 and WLAN AP 102 via uplink communication signals 111, 113 and 116. In one novel aspect, UE 103 connects with eNB 101 and is associated with WLAN AP 102. UE 103 is LWA-enabled. In one embodiment, the UE 103 is served with and aggregates data traffic from both eNB 101 and WLAN AP 102. In another embodiment, the UE may transmit data traffic to both eNB 101 and WLAN AP 102.

FIG. 1 further shows simplified block diagrams of eNB 101, WLAN AP 102, and mobile station 103 in accordance with the current invention. eNB 101 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in eNB 101. Memory 151 stores program instructions and data 154 to control the operations of eNB 101. eNB 101 also includes a set of control modules such LWA controller 115 that carry out functional tasks to support LWA features and to communicate with mobile stations.

Similarly, WLAN AP 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. WLAN AP 102 also includes a set of control modules, such as LWA controller 125 that carries out functional tasks to support the LWA features and to communicate with mobile stations.

Mobile station 103 has an antenna 136, which transmits and receives radio signals. A RF transceiver module 137, coupled with the antenna, receives RF signals from antenna 136, converts them to baseband signals and sends them to processor 132. RF transceiver 137 also converts received baseband signals from processor 132, converts them to RF signals, and sends out to antenna 136. Processor 132 processes the received baseband signals and invokes different functional modules to perform features in mobile station 103. Memory 131 stores program instructions and data 138 to control the operations of mobile station 103. Transceiver 137 of mobile station 103 includes two transceivers 133 and 135. Transceiver 135 transmits and receives transmissions to/from transceiver 153 of eNB 101. Transceiver 135 transmits and receives transmissions to/from transceiver 123 of WLAN 102. In another embodiment, mobile station 103 has only one transceiver, which handles radio link communications with eNB 101 and WLAN AP 102.

Figure 2:
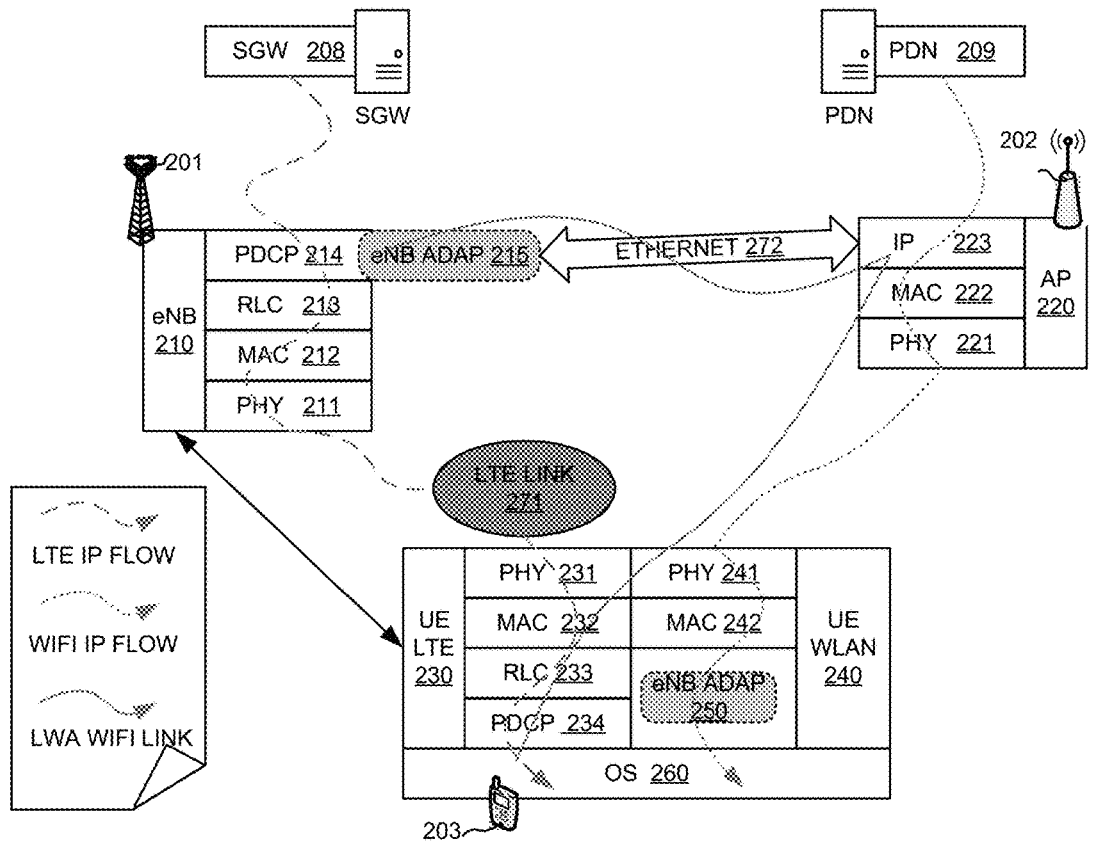
FIG. 2 illustrates an exemplary diagram of a data packets routing in a LWA system including a UE, an eNB and a WLAN AP in accordance with embodiments of the current invention.

Mobile station 103 also includes a set of control modules that carry out functional tasks. A LWA address manager 191 exchanges LWA address information with the eNB, wherein the LWA address information identifies LWA entities for the LWA. A de-encapsulator 192 de-encapsulates data packets received from the WLAN AP and identifies LTE packet data units (PDUs) based on a LWA routing rule. A decoder 193 obtains a dedicated radio bearer (DRB) ID from the data packets, wherein the DRB ID is included in a LWA header associated with the PDCP packet. An uplink (UL) handler 194 sends data packets to the WLAN AP, wherein the data packets are destined to the eNB FIG. 2 illustrates an exemplary diagram of a data packets routing in a LWA system including a UE, an eNB and a WLAN AP in accordance with embodiments of the current invention. A UE 203 is connected with an eNB 201. UE 203 selects a WLAN AP 202 for data traffic aggregation with eNB 201 and is associated with WLAN AP 202. eNB 201 connects with a serving gateway (SGW) 208 for data traffic. WLAN AP 202 connects with a PDN 209 for data traffic. eNB 201 has an eNB LTE modem 210, including a protocol stack comprises a PHY layer 211, a MAC layer 212, a radio link control (RLC) layer 213 and a PDCP layer 214. WLAN AP 202 has an AP WiFi modem 220, including a protocol stack comprises a PHY layer 221, a MAC layer 222, and an IP layer 223. UE 203 has dual stack, including a UE LTE modem 230, and a UE WLAN/WiFi modem 240. UE LTE modem has a protocol stack comprises a PHY layer 231, a MAC layer 232, a RLC layer 233, and a PDCP layer 234. UE WLAN modem has a protocol stack comprises a PHY layer 241, and a MAC layer 242. To support the LWA feature, eNB 201 has an eNB adaption module 215. In one embodiment, eNB adaption module is part of the PDCP layer 214. In another embodiment, eNB adaption module is separate from the PDCP layer 214. UE 203 also has an eNB adaption module 250 that communicates with the UE WLAN stack 240.

A LTE IP flow comes from SGW 208, passes through eNB 210 stack and gets to UE LTE 230 stack through a LTE link 271. On the other side, a regular WiFi IP flow come from PDN 209, passes through AP stack 220 and gets to UE 203 through UE WLAN stack 240. In one embodiment, data traffic between eNB 201 and UE 203 is diverted to WLAN AP 202 and aggregated. A LWA WiFi link path starts with encapsulated Ethernet frames from eNB adaption module 215 through an Ethernet channel 272 and gets to IP layer 223 of WLAN AP 202. WLAN AP 202 re-encapsulates the received data packets and sends it to UE 203.

In one novel aspect, data packets are routed through WLAN AP 202 using enhanced LWA PDU routing. At the first step, UE 203 exchanges LWA address information with eNB 201. In one embodiment, eNB 201 provides WLAN addresses to UE 203. UE 203 establishes association with WLAN AP 202. Upon associating with WLAN AP 202, UE 203 reports WLAN status information to eNB 201. In another embodiment, UE LTE modem 230 reports the associating AP's (WLAN AP 202) ID and its Wi-Fi modem (AP stack 220) MAC address. Hereafter, eNB 201 responds with its MAC address to LTE modem 230. In one embodiment, UE 203 keeps received LWA address information the adaption layer 250. eNB 201 keeps the received LWA address information in its database. eNB 201 may record multiple LWA WLAN AP information in its database.

At the second step, eNB adaption layer 215 of eNB 201 appends LWA header to indicate DRB ID or preferred access class (AC). The preferred AC is mapped from a specific QCI.

At the third step, eNB adaption layer 215 of eNB 201 encapsulates LTE PDUs (together with LWA header) as an Ethernet Frame. At the fourth step, eNB adaption layer 215 of eNB 201 sends the Ethernet Frame to WLAN AP. In one embodiment, the Ethernet frame is sent over IP. In another embodiment, the Ethernet Frame is sent using VLAN. At the fifth step, WLAN AP 202 performs Ethernet re-encapsulation. In one embodiment, the re-encapsulation involves replacing the 802.3 MAC header with the 802.11 MAC header and placing proper information at LLC/SNAP, and sending the MAC PDU (MPDU) to UE WiFi modem 240 over Wi-Fi link followed the specified AC in the LWA header. In the sixth step, UE eNB adaption module 250 de-encapsulates Ethernet frame and identifies LTE PDUs based on LWA routing rules. In a seventh step, UE eNB adaption module 250 decodes LWA header and gets the DRB ID to send the PDU to correct logical channel in UE LTE modem 230.

Figure 3:
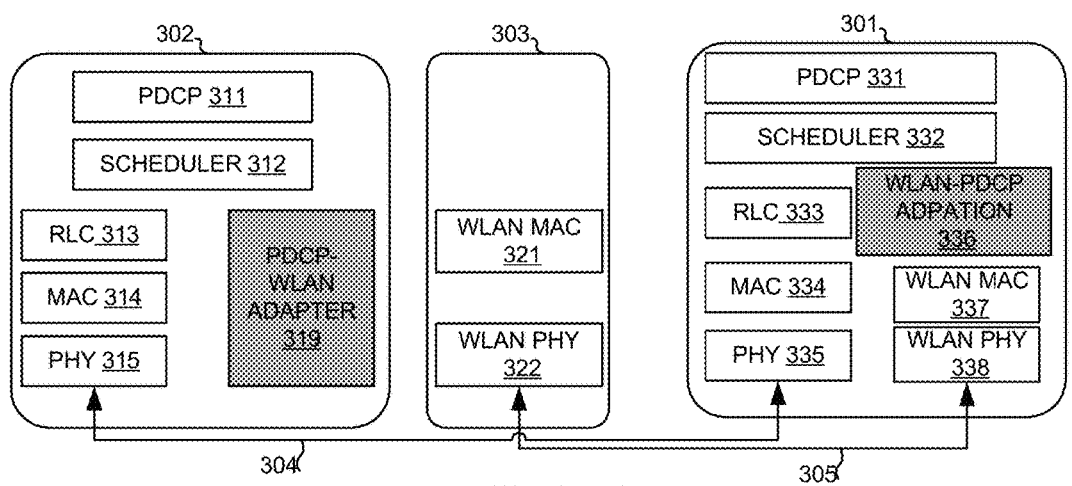
FIG. 3 shows exemplary block diagrams of a UE with LWA-enabled connecting with an eNB and a WLAN AP with data aggregation at radio link level in accordance with embodiments of the current invention.

FIG. 3 shows exemplary block diagrams of a UE with LWA-enabled connecting with an eNB and a WLAN AP with data aggregation at radio link level in accordance with embodiments of the current invention. A UE 301 is connected with an eNB 302. UE 301 also selects a WLAN AP 303 for data aggregation. eNB 302 has a PHY layer 315, a MAC layer 314, a RLC layer 313, a scheduler layer 312 and a PDCP layer 311. To enable the LWA, eNB 302 also has a PDCP-WLAN adapter 319 that aggregates the LTE data traffic through PHY 315 with WLAN data traffic through WLAN AP 303. WLAN AP 303 has a WLAN PHY 322 and a WLAN MAC layer 321. WLAN AP 303 connects with WLAN network and can offload data traffic from the LTE network when the UE with LWA enabled is connected with both the LTE eNB and the WLAN AP.

UE 301 is LWA-enabled. UE 301 has a PHY 335, a MAC 334, and a RLC layer 333 that connect with the LTE eNB 302. UE 301 also has a WLAN PHY layer 338 and a WLAN MAC layer 337 that connect with WLAN AP 303. A WLAN-PDCP adaption layer 336 handles the split carrier from the LTE and the WLAN. UE 301 also has a scheduler 332 and PDCP 331. In novel aspect, the WLAN AP is selected based on a LWA assistance configuration. UE 301 aggregation its data traffic with eNB 302 and WLAN AP 303. WLAN PHY 322 of WLAN AP 303 connects with WLAN PHY 338 of UE 301 through WLAN interface. PHY 315 of LTE eNB 302 connects with PHY 335 of UE 301 through uu interface. Both the LTE data traffic and the WLAN data traffic is aggregated at the PDCP layer of UE 301.

Figure 4A:
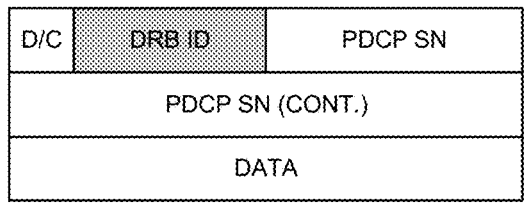
FIG. 4A illustrates an exemplary data structure using reserved bits in PDCP header for DRB in accordance with embodiments of the current invention.
Figure 4B:
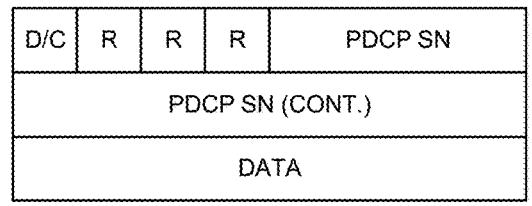
FIG. 4B illustrates an exemplary data structure using default DRB in accordance with embodiments of the current invention.
Figure 4C:
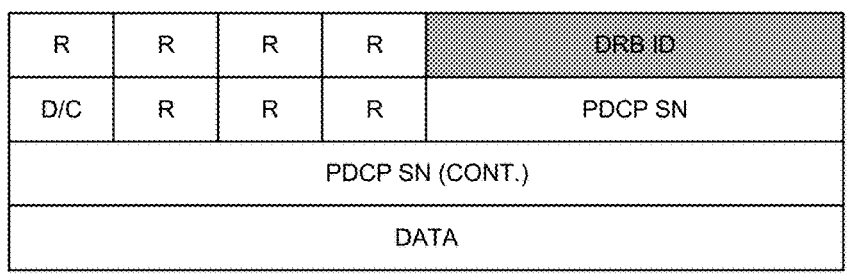
FIG. 4C illustrates an exemplary data structure Using a new LWA header wherein the DRB ID is appended in accordance with embodiments of the current invention.
Figure 5:
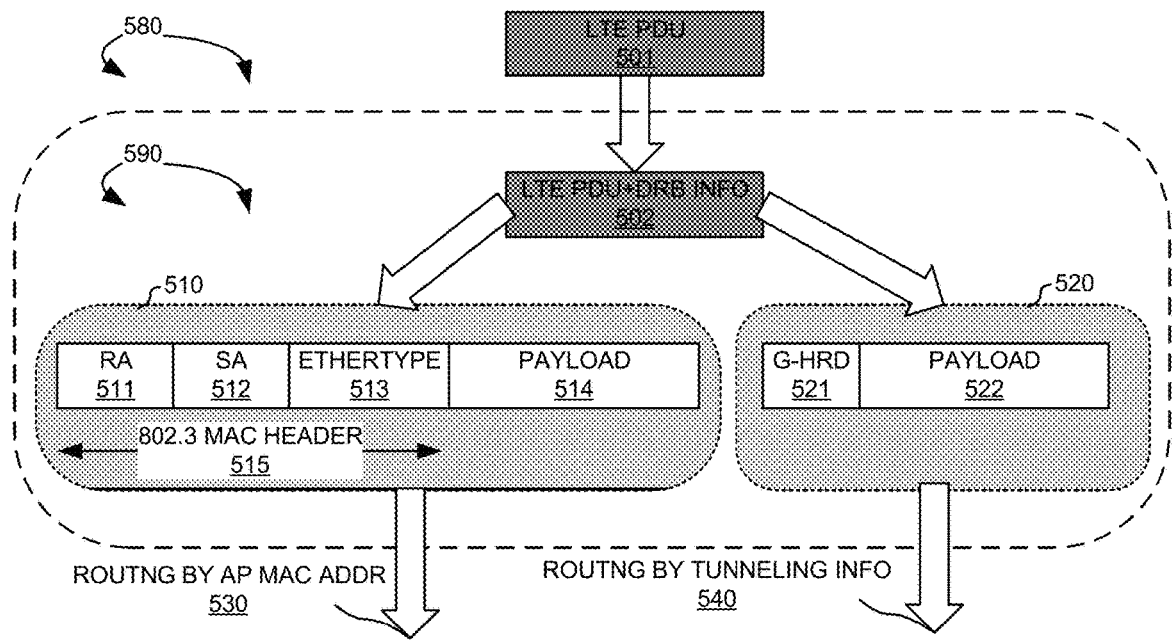
FIG. 5 illustrates an exemplary diagram for encapsulating layer solution for LWA data routing in accordance with embodiments of the current invention.

FIGS. 4A, 4B, and 4C illustrate different solutions for DRB identification in the PDCP packets for LWA in accordance with embodiments of the current invention.

FIG. 4A illustrates an exemplary data structure using reserved bits in PDCP header for DRB in accordance with embodiments of the current invention. Three reserved bits in the current PDCP packet is used for DRB. This solution is applicable for U-plane PDCP PDU with long PDCP SN. In one embodiment, a restriction is put on the PDCP SN configuration when applying this solution. The pdcp-SN-size is set to be twelve and subsequently the reordering window=2048. With this solution, only eight DRBs could be signaling, which limits at most eight bearer supported for LWA. The adaption layer of the eNB fulfills the bits based on the associating bearer ID.

FIG. 4B illustrates an exemplary data structure using default DRB in accordance with embodiments of the current invention. Under this solution, there is no change to the structure. The entities are preconfigured with default DRBs for the LWA PDU. This solution is only applicable for one splitting bearer under LWA.

FIG. 4C illustrates an exemplary data structure using a new LWA header wherein the DRB ID is appended in accordance with embodiments of the current invention. This solution adds a LWA header at the beginning of the PDCP PDU. The adaption layer specifies the DRB ID in the header. In one embodiment, other information, such the QoS information may be appended in this field. This solution is applicable for any PDCP SN length with extra overhead.

A LTE PDU 501 passes to an eNB adaption layer 590 through an eNB PDU layer 580. The adaption layer adds bearer information to the LTE PDU and generates LTE PDU+Bearer Information packet 502. In one embodiment, the adaption layer treats LTE PDU as a payload and appends IEEE 802.3 MAC header 515 (Ethernet) to encapsulate the whole packet 510. Packet 510 includes a receiver address (RA) 511, a source address (SA) 512, an Ethernet type 513, and a payload 514. In one embodiment, RA 511 may be the MAC address of the Wi-Fi modem of the destination UE. SA 512 may be the MAC address of the eNB. Packet 510 is routed by WLAN AP's MAC address at step 530. When WLAN AP belongs to same LAN with eNB, the LTE PDU can route to AP by its MAC address, otherwise, an Ethernet over IP tunneling is used for such routing by the IP address of the WLAN AP. Since UE WiFi modem cannot acquire the AP's IP address directly, the WiFi modem reports associating AP's ID (including SSID, HESSID, or BSSID) to the eNB. Subsequently, the eNB can acquire the AP's IP address and enable IP tunneling by itself. In another embodiment, the adaption layer appends a GRE header to the LTE PDU and sends the GRE packet through a pre-configured GRE tunnel. A GRE header 521 is added to a payload 522 to form the packet 520. In one embodiment, packet 520 is routed by tunnel information at step 540.

Figure 6:
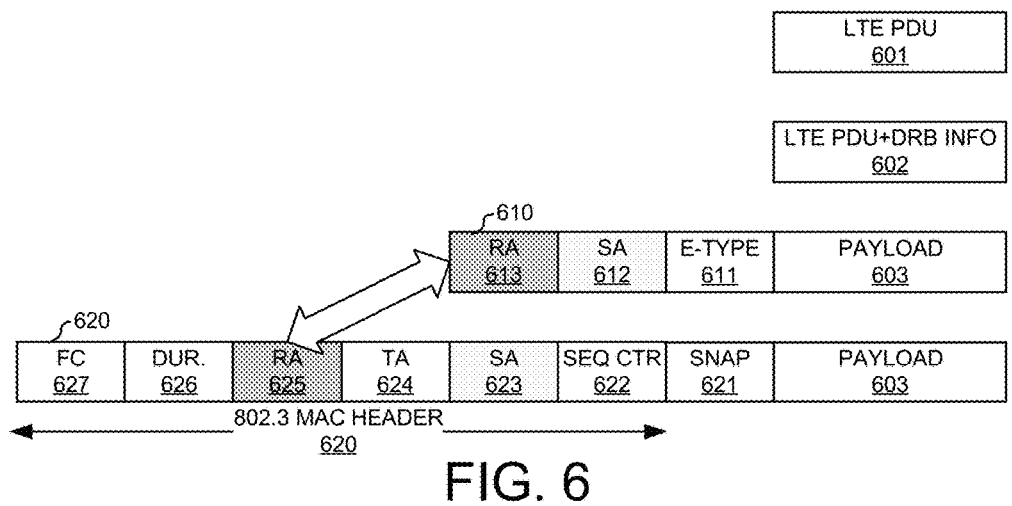
FIG. 6 illustrates an exemplary data structure of the re-encapsulated PDU using Ethernet routing in accordance with embodiments of the current invention.

Upon receiving the encapsulated packets from the eNB, the WLAN AP re-encapsulates the data packets and route it to the UE. FIG. 6 illustrates an exemplary data structure of the re-encapsulated PDU using Ethernet routing in accordance with embodiments of the current invention. WLAN AP identifies RA (Wi-Fi modem MAC address) of Ethernet frame and encapsulate Ethernet frame as MPDU by appending the same RA in its MAC header. If WLAN AP belongs to same LAN, it is feasible to send the Ethernet frame to MAC layer directly for MPDU processing (by inserting EtherType information in SNAP to support non-IEEE payload transmission over Wi-Fi link). Otherwise, Ethernet over IP is used that an IP header is appended in the Ethernet and the WLAN AP will send this packet to its IP layer for decoding. After decoding, IP layer identifies the destination is Wi-Fi modem, and it will forward it to MAC layer for MDPU processing. If WLAN AP is configured as VLAN for eNB, no need to use Ethernet over IP, the WLAN AP can grab the packet from the broadcasted domain and directly send to its MAC layer. The WLAN AP could aggregate LWA PDU (encapsulated as Ethernet frame) with a normal IP packet from PDN as an A-MDPU and send to the WiFi modem.

A LTE packet 601 is an original PDU packet. A LWA header including the DRB information is appended to LTE PDU 601 to form a packet 602. The WLAN AP adds Ethernet header to form the Ethernet Frame 610 by appending RA 613, SA 612, and an Ethernet Type 611. Packet 610 is re-encapsulated by WLAN AP to form a packet 620, which includes a SNAP/LLC header 621, a sequence control 622, a SA 623, which is the MAC address of eNB, a TA 623, which the WLAN AP's MAC address, a RA 625, which the MAC address of UE's WiFi modem, a duration 626 and a frame control 627.

Figure 7:
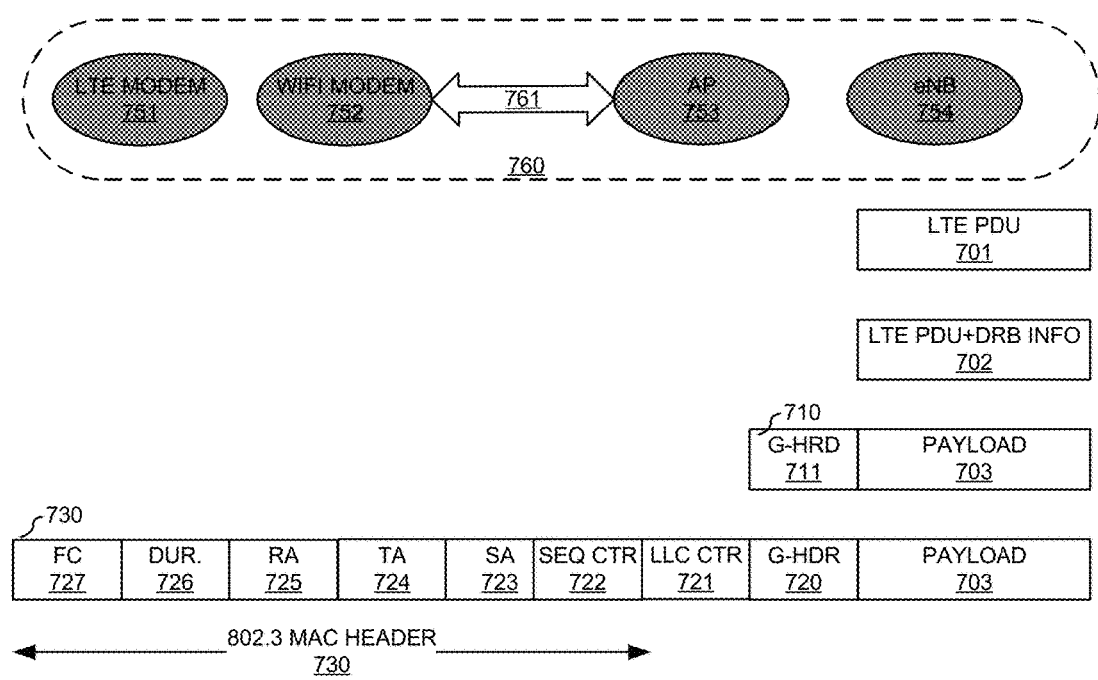
FIG. 7 illustrates an exemplary data structure of the re-encapsulated PDU using GRE tunneling in accordance with embodiments of the current invention.

FIG. 7 illustrates an exemplary data structure of the re-encapsulated PDU using GRE tunneling in accordance with embodiments of the current invention. WLAN AP follows the GRE tunnel configuration to forward the GRE packet based on given tunnel destination IP address. WLAN AP needs to map the Wi-Fi IP address to its MAC address and encapsulate GRE packet as MPDU by appending the mapping MAC address in its MAC header. Identically, the WLAN AP could aggregate LWA PDU (encapsulated as GRE packet) with normal IP packet as an A-MDPU and send to the Wi-Fi modem.

A GRE Tunneling includes entities of a LTE modem 751, a WiFi modem 752, an AP 753, and an eNB 754. A connection 760 connects the WiFi Modem and the AP through a WiFi radio link. A LTE packet 601 is an original PDU packet. A LWA header including the DRB information is appended to LTE PDU 701 to form a packet 702. The WLAN AP adds Ethernet header to form the data packet 710 by appending a GRE header 711. Packet 710 is re-encapsulated by WLAN AP to form a packet 730, which includes GRE header 720, a SNAP/LLC header 721, a sequence control 722, a SA 723, which is the MAC address of eNB, a TA 723, which the WLAN AP's MAC address, a RA 725, which the MAC address of UE's WiFi modem, a duration 726 and a frame control 727.

In another embodiment, WLAN AP follows the GTP tunneling configuration to forward the packet based on given TEID (Tunnel Endpoint Identifier). WLAN AP needs to identify which UE the TEID belonged to (this may be made by the control interface between eNB and AP), thereafter, the WLAN AP can decode the TEID field to understand the forwarding path.

Figure 8:
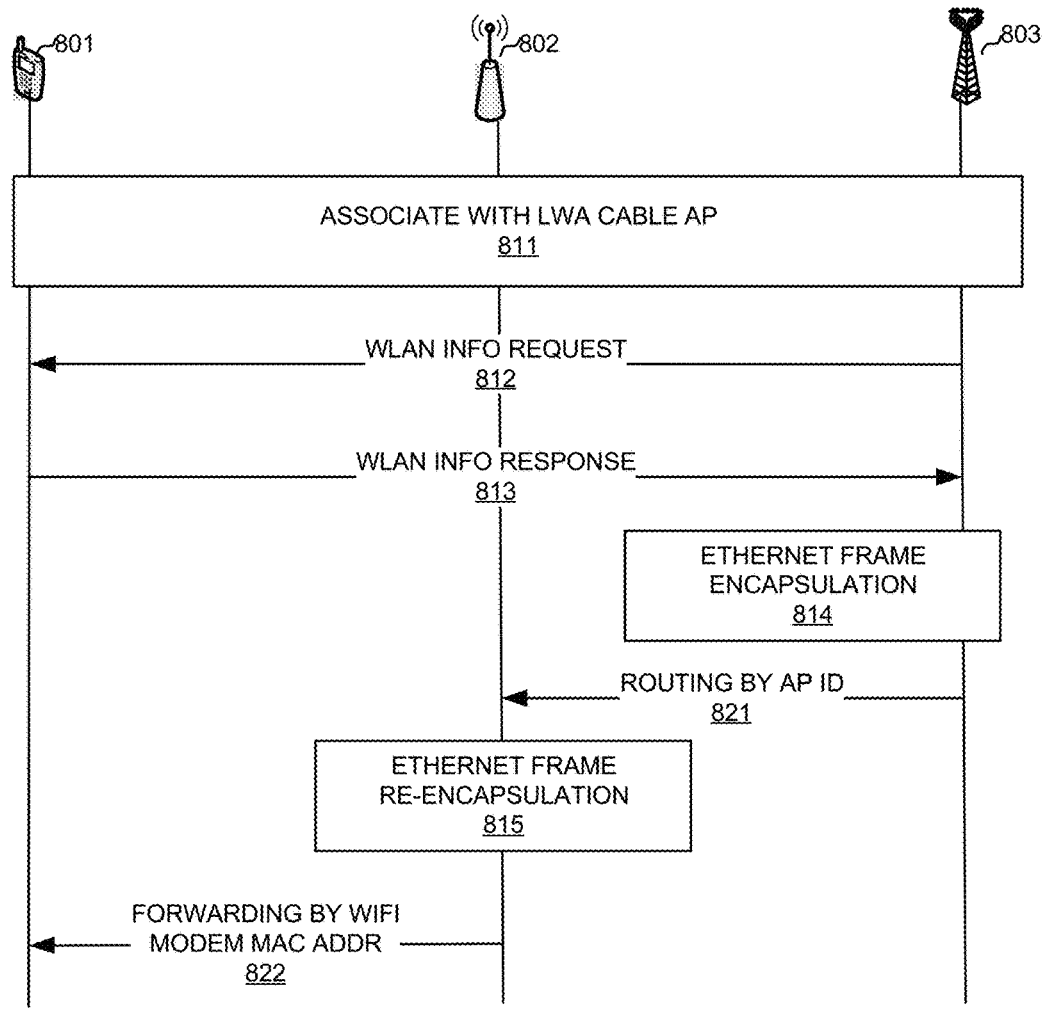
FIG. 8 is an exemplary flow chart of LWA data packet routing by WLAN AP ID in accordance with embodiments of the current invention.

FIG. 8 is an exemplary flow chart of LWA data packet routing by WLAN AP ID in accordance with embodiments of the current invention. In one embodiment, after LWA association, the eNB may append its MAC address and send a WLAN information request message to the LTE modem and then the LTE modem may exchange such information with Wi-Fi modem. Afterwards, the LTE modem may send a WLAN information response message to eNB for reporting Wi-Fi modem MAC address and associating WLAN AP ID to eNB. The LWA address information may be kept at the database in adaption layer. The addressing information may be pre-acquired between eNB and candidate APs, the UE is only required to report AP's ID (e.g. BSSID) and the eNB could get the MAC/IP address information by checking the database. In other embodiment, there are multiple LWA accesses, with respect to WLAN APs/Wi-Fi modems. The LTE modem can report multiple MAC addresses for individual LWA-WiFi link. In yet another embodiment, UEs, such as smartphones, equipped with multiple LTE modems can camp on different eNBs respectively. The respective eNB can negotiate its MAC address for corresponding LWA.

A UE 801 is connect with an eNB 803 and selects a WLAN AP 802 for LWA. At step 811, establishes association with LWA enabled AP 802. At step 812, eNB 803 sends a WLAN information request to UE 801. At step 813, UE 801 replies with a WLAN information response. At step 814, eNB 803 performs Ethernet frame encapsulation. At step 821, encapsulated data packet is routed to AP 802 by the AP ID. At step 815, WLAN AP 802 performs Ethernet frame re-encapsulation. At step 822, data packet is forwarded to UE 801 by AP 802 using the MAC address of the UE's WiFi modem.

Figure 9:
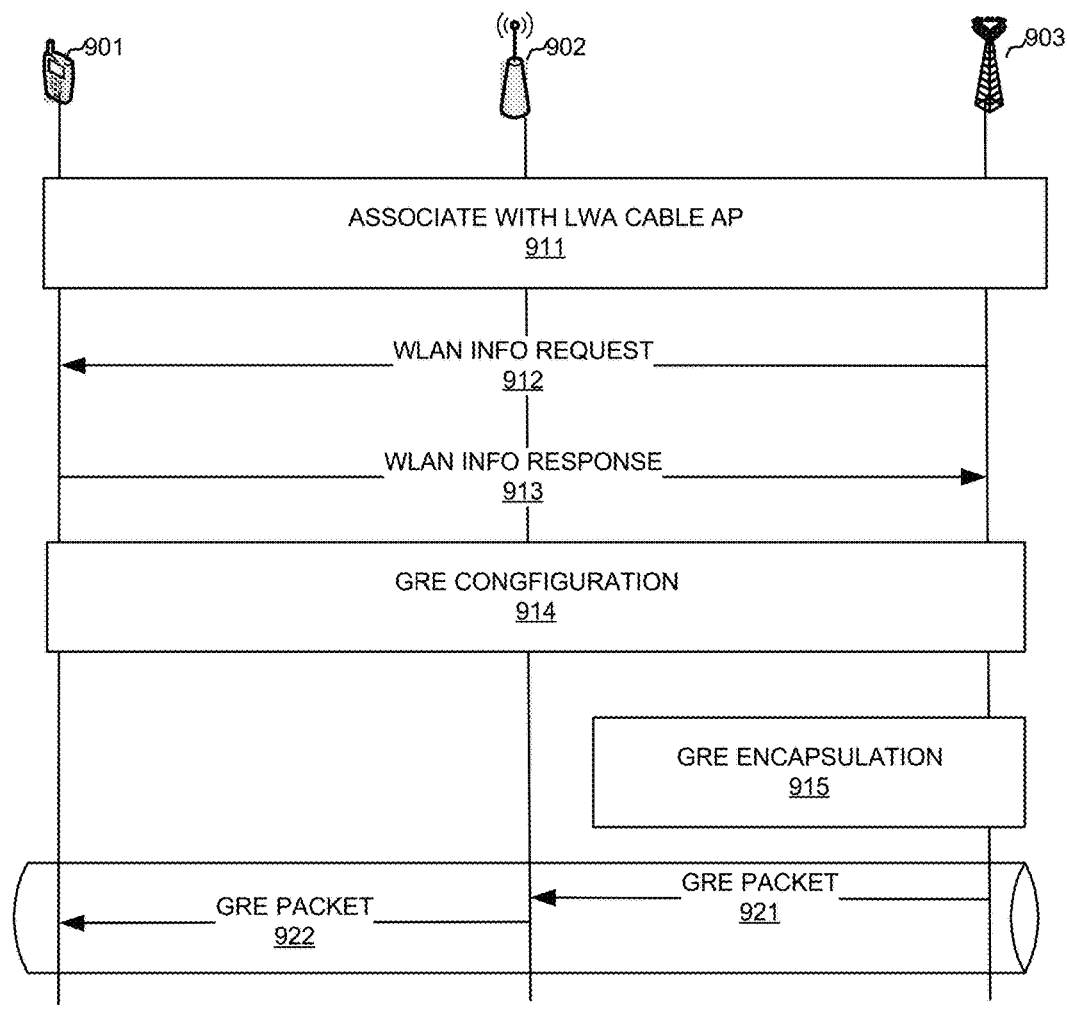
FIG. 9 illustrates an exemplary flow chart of LWA data packet routing as GRE packets in accordance with embodiments of the current invention.

FIG. 9 illustrates an exemplary flow chart of LWA data packet routing as GRE packets in accordance with embodiments of the current invention. In one embodiment, the adaption layer appends a GRE header to the LTE PDU and sends the GRE packet through a pre-configured GRE tunnel. The GRE tunnel is accomplished by creating routable tunnel endpoints that operate on top of existing physical and/or other logical endpoints. For example, an eNB/LTE modem is the endpoint. The adaption layer performs GRE configuration. The tunnel source is the IP address of the eNB. The tunnel destination is IP address of the LTE modem. The tunnel inner IP is the IP address of the WiFi modem.

A UE 901 is connect with an eNB 902 and selects a WLAN AP 903 for LWA. At step 911, UE 901 establishes association with LWA enabled AP 902. At step 912, eNB 903 sends a WLAN information request to UE 901. At step 913, UE 901 replies with a WLAN information response. At step 914, eNB 903 performs GRE configuration. At step 915 eNB 903 performs GRE encapsulation. At step 921, encapsulated data packet is routed to AP 902 through GRE tunneling. At step 922, encapsulated data packet is routed to UE 901 by through GRE tunneling. The packet over GRE tunnel is transparent to WLAN AP. The adaption layer will configure loopback virtual interface for LTE modem's IP address. The WLAN AP passes the GRE packet to Wi-Fi modem when it finds the loopback. The UE WiFi modem can recognize LTE PDU by the GRE header. This solution is useable regardless of WLAN AP belongs to same/different LAN and LTE modem needs to report Wi-Fi modem's IP address and associating AP's ID to the eNB. In one embodiment, the eNB may configure GRE in-advanced and signals the supported AP's ID list to LTE modem for WLAN discovery. Alternatively, the eNB could configure GRE after receiving the AP's ID if Wi-Fi modem discovery the WLAN AP by itself. The Wi-Fi modem's IP address may be the same as LTE modem's address. Under this case, the LTE modem may not report the IP address to the eNB.

Figure 10:
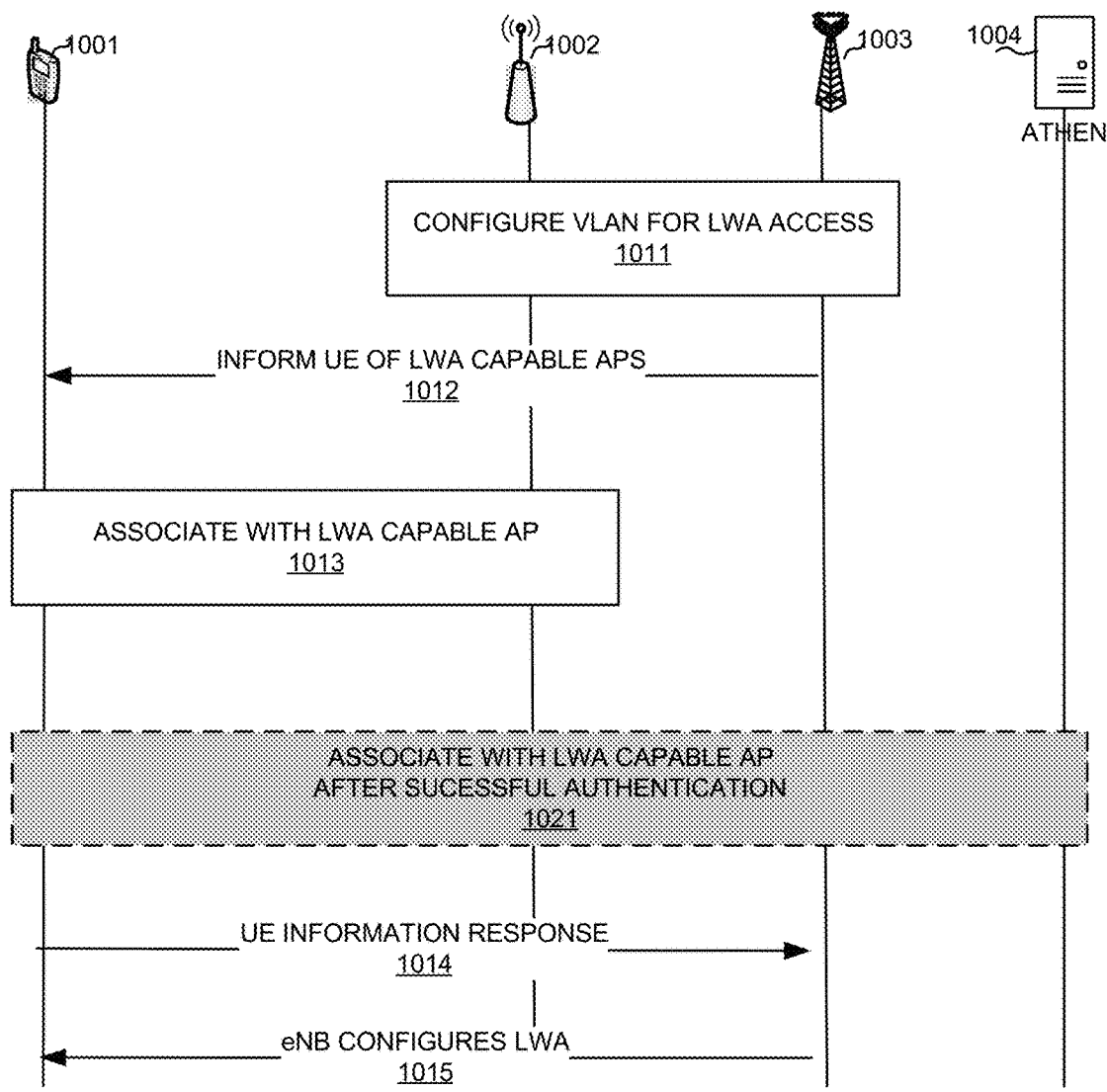
FIG. 10 illustrates an exemplary flow chart of LWA data packet routing by VLAN in accordance with embodiments of the current invention.

FIG. 10 illustrates an exemplary flow chart of LWA data packet routing by VLAN in accordance with embodiments of the current invention. The adaption layer configures a VLAN for LWA that VLAN ID (tag) is assigned for eNB and WLAN AP. In one embodiment, the configuration is static. The VLAN pre-configuration with dedicated port. The eNB broadcasts the capable APs for LWA selection. In another embodiment, the configuration is dynamic. The Authentication Server maintains a database for VLAN membership and switch ports based on connected device's information. The adaption layer encapsulate LTE PDU as Ethernet frame with appending 802.1Q header (The header specifies the VLAN ID), thus the Ethernet frame could be sent to the logical broadcast domain and WLAN AP will grab the frame based on VLAN ID.

A UE 1001 is connected with an eNB 1003 and is within coverage area of an LWA-capable AP 1002. At step 1011, eNB 1003 and AP 1002 configures VLAN for LWA access. At step 1012, eNB 1003 informs UE 1001 of the LWA capable AP. At step 1013, UE 1001 establishes association with AP 1002. In one embodiment, optionally at step 1021, UE 1001 associates with AP 1002 after successfully authenticated with an Authentication center 1004. At step 1014, UE 1001 sends UE information response to eNB 1003. At step 1015, eNB 1003 sends eNB configuration LWA information to UE 1001.

In one novel aspect, the UE routes the uplink data packets through a LWA-capable WLAN AP. When UL packet arriving at LTE modem, the LTE modem may decide to route this packet through LWA-Wi-Fi link and the LTE PDU routing problems become how WLAN AP ferry the PDU to eNB. In one embodiment, the adaption layer of the UE LTE modem encapsulates LTE PDU as an Ethernet frame. SA is the WiFi modem's MAC address, and RA is the eNB's MAC address. The eNB may signal its MAC address to the UE LTE modem for the encapsulation. When WLAN AP receives the frame and recognize the PDU as LTE PDU, then it will forward the PDU to the specified eNB by the RA. The recognition could be done by checking the EtherType or RA address.

In another embodiment, the UE LTE modem's adaption layer encapsulates LTE PDU as GRE packet. The tunnel source is LTE modem's IP address, tunnel destination is eNB's IP address and the tunnel inner IP is WLAN AP's IP address. In yet another embodiment, a VLAN is configured for WLAN AP. The AP will always forward the received PDU to the eNB with the same VLAN ID. In another embodiment, the UE applies the GTP-U protocol to let WLAN AP forward PDU to eNB. The WLAN AP is capable of GTP-U protocol and the AP can establish the GTP tunneling with eNB to forward the PDUs to eNB. The UE needs to encapsulate the PDU as an LTE-specific packet (e.g. by EtherType) and then the WLAN AP is able to recognize that for future processing (e.g. adding GTP-U header and ferry it via the interface between eNB and AP).

In another novel aspect, solutions for the LTE PDU identification for LWA are provided. These solutions apply to both DL and UL cases. In one embodiment, LTE PDU is identified by EtherType value. With Ethernet frame encapsulation, the Wi-Fi modem can recognize the Ethernet frame as LTE PDU by using a new EtherType value, for instance, EtherType=LWA, Wi-Fi modem knows the PDU shall forward to LTE modem. In another embodiment, LTE PDU is identified by the source address. For DL case, using source address (eNB's MAC address) is an implicit indication when Ethernet frame is encapsulated for the LTE PDU. The eNB notifies its MAC address to LTE modem, afterwards, LTE modem exchange such information with Wi-Fi modem. When Wi-Fi modem finding the address, it knows the PDU shall forward to LTE modem. It is possible to have multiple eNB MAC address whereby different address belongs to different QoS/QCI/E-RAB (E-URTAN Radio Access Bearer) flow. The eNB might be required to exchange such addressing information with WLAN AP to let it know the appropriate treatment for different flow. The eNB might require to exchange the address information with UE to let it know the current buffer destination for the reordering. For UL case, then using source address (LTE modem's MAC address) and WLAN AP may forward the PDU to eNB. The eNB may notify the WLAN AP of LTE modem's MAC address. It is also possible to have multiple LTE modem's MAC address to represent the different E-RAB flow implicitly.

In yet another embodiment, LTE PDU is identified by the GRE header. The Wi-Fi modem can recognize LTE PDU by the GRE header that it will forward the packet to LTE modem after decoding the header. In one embodiment, LTE PDU is identified using default path. The Wi-Fi modem always forwards the received PDU to LTE modem. In another embodiment, the LTE PDU is identified using GTP header. While GTP tunneling is applied for eNB and WLAN AP, the GTP header will be appended following the UDP/TCP header. Thus, the WLAN AP can recognize the packet as LTE PDU when it decoded the GTP header.

Figure 11:
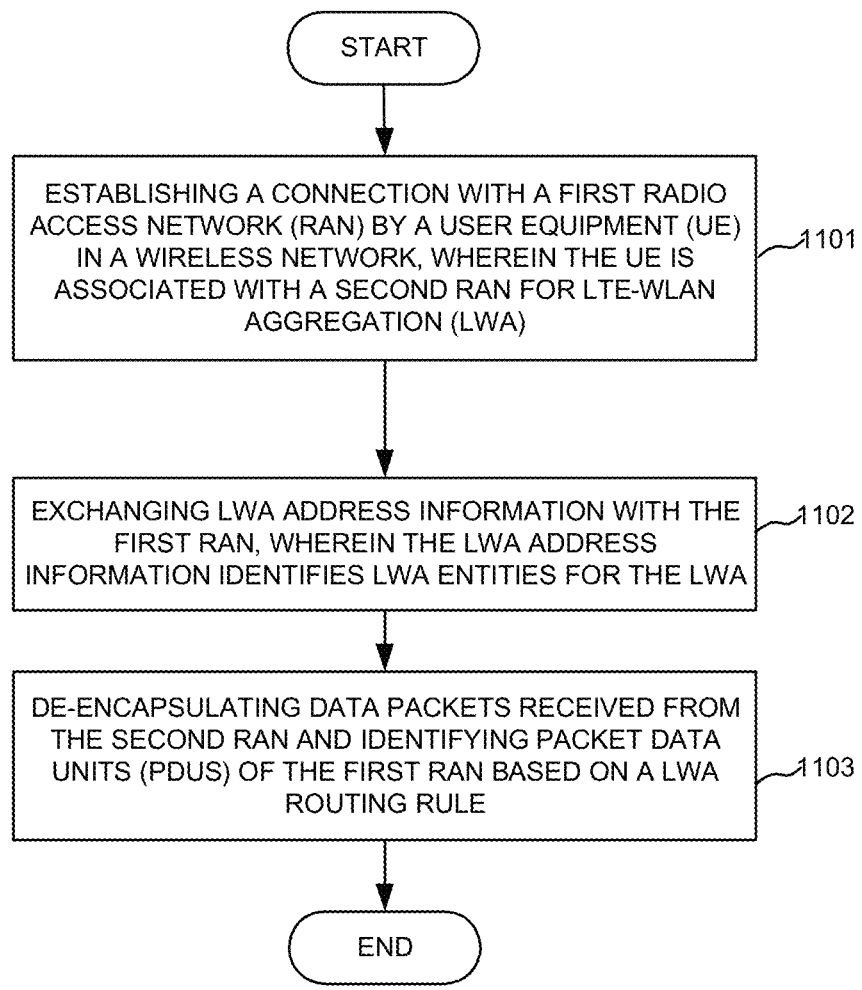
FIG. 11 shows an exemplary flow chart of the UE receiving LWA data packets from a WLAN AP originated from an eNB in accordance with embodiments of the current invention.

FIG. 11 shows an exemplary flow chart of the UE receiving LWA data packets from a WLAN AP originated from an eNB in accordance with embodiments of the current invention. At step 1101, the UE establishes a connection with a first radio access network (RAN) in a wireless network, wherein the UE is associated with a second RAN for LTE-WLAN aggregation (LWA). At step 1102, the UE exchanges LWA address information with the first RAN, wherein the LWA address information identifies LWA entities for the LWA. At step 1103, the UE de-encapsulates data packets received from the second RAN and identifying packet data units (PDUs) of the first RAN based on a LWA routing rule.

Figure 12:
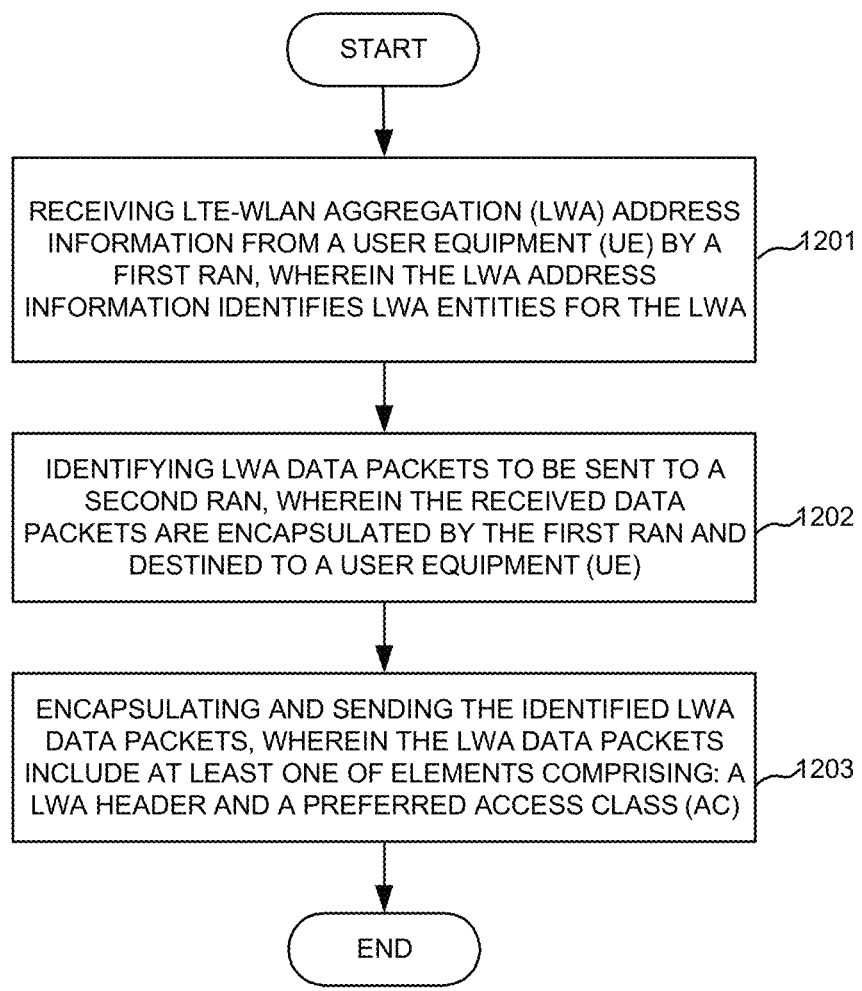
FIG. 12 shows an exemplary flow chart of the eNB sending LWA data packets to a WLAN AP originated destined to an UE in accordance with embodiments of the current invention.

FIG. 12 shows an exemplary flow chart of the eNB sending LWA data packets to a WLAN AP originated destined to an UE in accordance with embodiments of the current invention. At step 1201, the eNB receives LTE-WLAN aggregation (LWA) address information from a user equipment (UE) by a first RAN, wherein the LWA address information identifies LWA entities for the LWA. At step 1202, the eNB identifies LWA data packets to be sent to a second RAN, wherein the received data packets are encapsulated by the first RAN and destined to a user equipment (UE). At step 1203, the eNB encapsulates and sends the identified LWA data packets, wherein the LWA data packets include at least one of elements comprising: a LWA header and a preferred access class (AC).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a connection with a first radio access network (RAN) by a user equipment (UE) in a wireless network, wherein the UE is associated with a second RAN for LTE-WLAN aggregation (LWA);
   exchanging, by the user equipment (UE), LWA address information with the first RAN, wherein the LWA address information identifies LWA entities for the DNA and comprises an identification (ID) and a MAC address of the associated second RAN sending to the first RAN; and
   de-encapsulating, by the user equipment (UE), data packets received from the second RAN and identifying packet data units (PDUs) of the first RAN based on an LWA routing rule.

2. The method of claim 1, wherein the LWA routing rule is Ethernet frame encapsulating, and wherein the first RAN PDU is identified by reading a source address from the Ethernet frame, and wherein the source address is a MAC address of the first RAN.

3. The method of claim 1, wherein the LWA routing rule is Generic Routing Encapsulation (GRE) tunneling, and wherein the first RAN PDU is identified by reading a GRE header.

4. The method of claim 1, wherein the LWA routing rule is Ethernet frame encapsulating, and wherein the first RAN PDU is identified by reading an EtherType IE.

5. The method of claim 1, further comprising: obtaining a dedicated radio bearer (DRB) ID from the data packets, wherein the DRB ID is included in a LWA header of a PDCP header.

6. The method of claim 1, further comprising: sending data packets to the second RAN, wherein the data packets are destined to the first RAN.

7. The method of claim 6, wherein the data packets are encapsulated Ethernet frames, and wherein a source address (SA) of the Ethernet frames is a MAC address of a WiFi modem of the UE, and a receiver address (RA) is a MAC address of the first RAN.

8. The method of claim 6, wherein the data packets are encapsulated as GRE packets, and wherein a tunnel source address is an IP address of a first RAN modem of the UE, a tunnel destination address is an IP address of the first RAN, and a tunnel inner IP address is an IP address of the second RAN.

9. The method of claim 6, wherein an EtherType of the data packets indicates LWA packets.

10. A method comprising:
    receiving LTE-WLAN aggregation (LWA) address information from a user equipment (UE) by a first RAN, wherein the LWA address information identifies LWA entities for the LWA;
    identifying LWA data packets to be sent to a second RAN, wherein the received data packets are encapsulated by the first RAN and destined to a user equipment (UE), wherein LWA data packets are encapsulated as Ethernet frames; and
    encapsulating and sending the identified LWA data packets, wherein the LWA data packets include at east one of elements comprising: an LWA header and a preferred access class (AC).

11. The method of claim 10, wherein the LWA data packets are identified as LWA data packets based on a source address of the Ethernet frames.

12. The method of claim 10, wherein the LWA data packets are identified as LWA data packets based on an EtherType of the Ethernet frames.

13. The method of claim 10, wherein LWA data packets are encapsulated as Generic Routing Encapsulation (GRE) packets.

14. The method of claim 10, wherein the LWA data packets are sent through a predefined VLAN, and wherein the VLAN is preconfigured for LWA data packet.

15. A user equipment (UE) connecting with a first RAN in a wireless communication network, comprising:
    a radio frequency (RF) transceiver that transmits and receives radio signals in the wireless communication network with the first RAN and a second RAN for LTE-WLAN aggregation (LWA);
    an LWA address manager that exchanges LANA address information with the first RAN, wherein the LWA address information identifies LWA entities for the LWA and comprises an identification (ID) and a MAC address of the associated second RAN sending to the first RAN; and
    a de-encapsulator that de-encapsulates data packets received from the second RAN and identifies the first RAN packet data units (PDUs) based on an LWA routing rule.

16. The UE of claim 15, further comprising: a decoder that obtains dedicated radio bearer (DRB) ID from the data packets, wherein the DRB ID is included in a LWA header of a PDCP header.

17. The UE of claim 15, further comprising: an uplink (UL) handler that sends data packets to the second RAN, wherein the data packets are destined to the eNB.

18. The UE of claim 17, wherein the data packets are encapsulated Ethernet frames, and wherein a source address (SA) of the Ethernet frames is a MAC address of a WiFi modem of the UE, and a receiver address (RA) is a MAC address of the eNB.

19. The UE of claim 17, wherein the data packets are encapsulated as GRE packets, and wherein a tunnel source address is an IP address of a first RAN modem of the UE, a tunnel destination address is an IP address of the first RAN, and a tunnel inner IP address is an IP address of the second RAN.

20. The UE of claim 17, wherein an EtherType of the data packets indicates LWA packets.

* * * * *

UNITED STATES PATENT AND TRADEMARK OFFICE
CERTIFICATE OF CORRECTION

| | | |
|---|---|---|
| PATENT NO. | : 9,781,652 B2 | Page 1 of 1 |
| APPLICATION NO. | : 15/015396 | |
| DATED | : October 3, 2017 | |
| INVENTOR(S) | : Chia-Chun Hsu et al. | |

It is certified that error appears in the above-identified patent and that said Letters Patent is hereby corrected as shown below:

In the Claims

Column 11, Lines 17, Claim 1: the word "DNA" should be "LWA".

Column 12, Lines 5, Claim 10: the word "east" should be "least".

Column 12, Lines 29, Claim 15: the word "LANA" should be "LWA".

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*